United States Patent [19]

Gelhard

[11] Patent Number: 4,541,500
[45] Date of Patent: Sep. 17, 1985

[54] BICYCLE, IN PARTICULAR WITH AN ELECTROMOTOR

[76] Inventor: Egon Gelhard, Zum Kelderberg 3, 5352 Zülpich-Dürscheven, Fed. Rep. of Germany

[21] Appl. No.: 440,030

[22] Filed: Nov. 8, 1982

[30] Foreign Application Priority Data

Nov. 12, 1981 [DE] Fed. Rep. of Germany ....... 3144884
Mar. 9, 1982 [DE] Fed. Rep. of Germany ....... 3208345

[51] Int. Cl.⁴ .............................................. B62M 7/12
[52] U.S. Cl. ..................................... 180/205; 180/220
[58] Field of Search ............... 180/205, 206, 216, 217, 180/220; 280/236, 238

[56] References Cited

U.S. PATENT DOCUMENTS 3,372,608  3/1968  Gleasman ........................... 280/238
3,921,745  11/1975 McCulloch et al. ................ 180/205
4,095,663  6/1978  Gaffney ............................. 180/205
4,410,060  11/1983 Conard ............................. 180/205

*Primary Examiner*—Joseph F. Peters, Jr.
*Assistant Examiner*—Donn McGiehan
*Attorney, Agent, or Firm*—Michael J. Striker

[57] ABSTRACT

A bicycle is provided with a pedal drive and an electro-drive with an electromotor. They both are mounted on the boss of the rear wheel of the bicycle and can operate together or separately due to the provision thereof with individual freewheeling devices.

26 Claims, 19 Drawing Figures

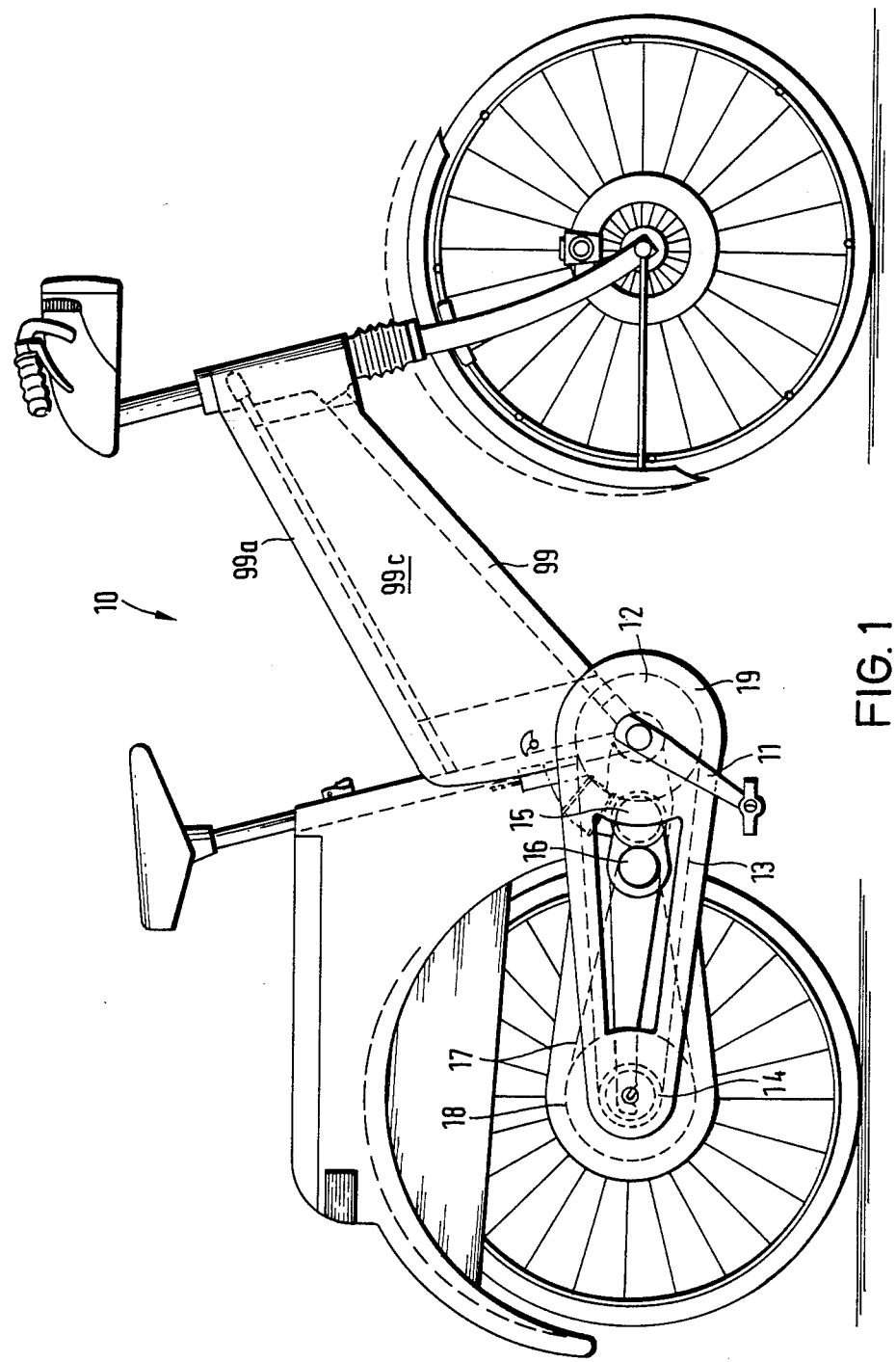

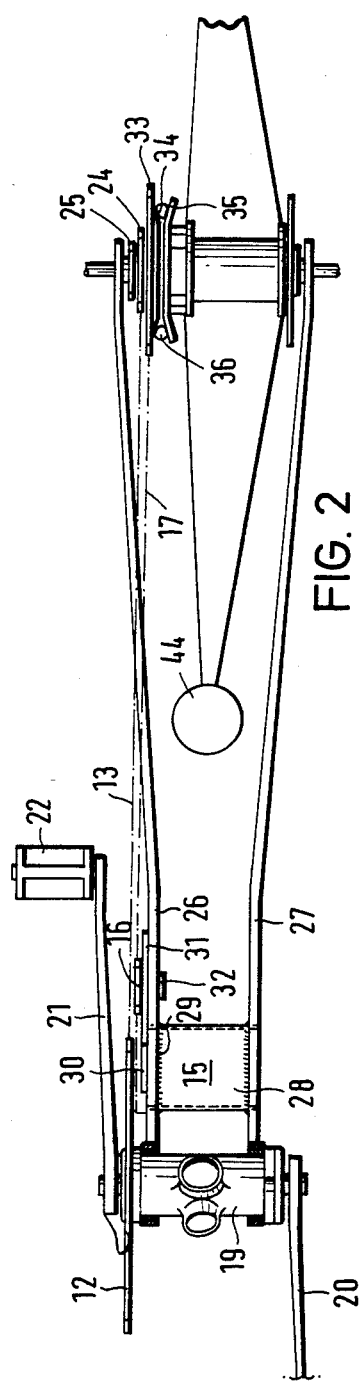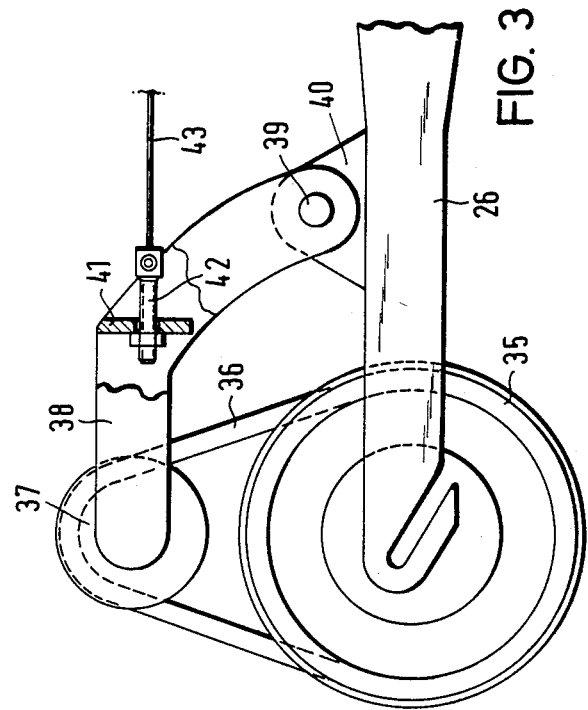

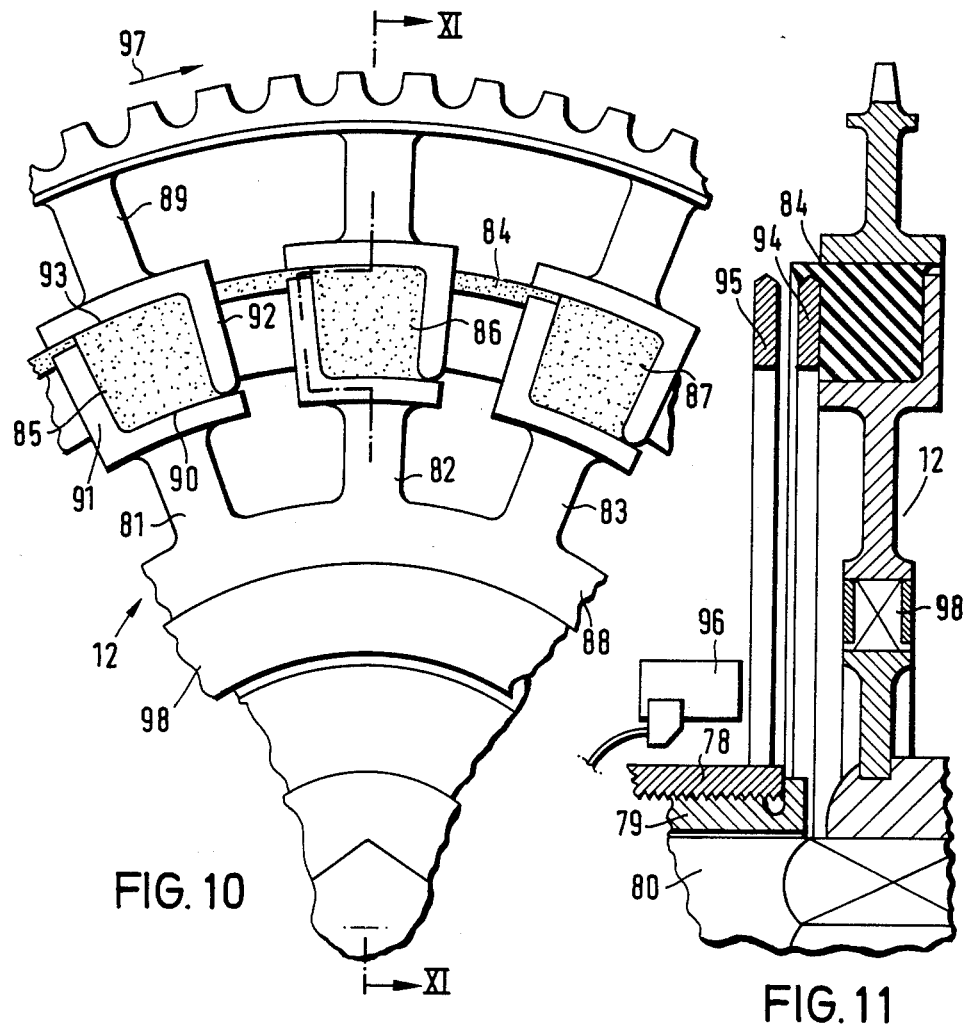
FIG. 10
FIG. 11
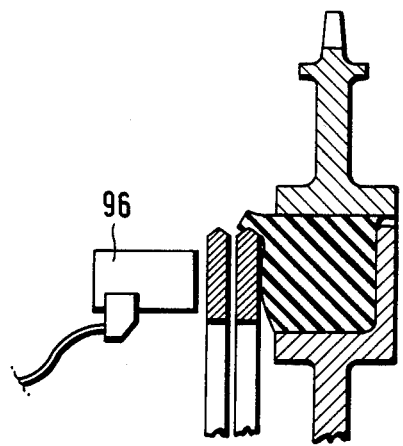
FIG. 12

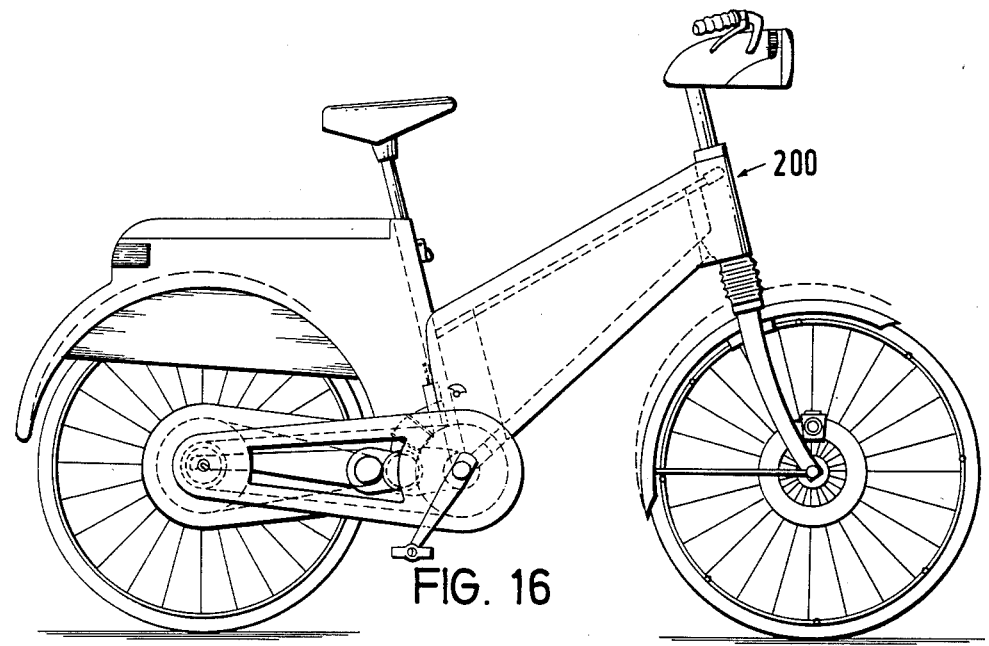
FIG. 16
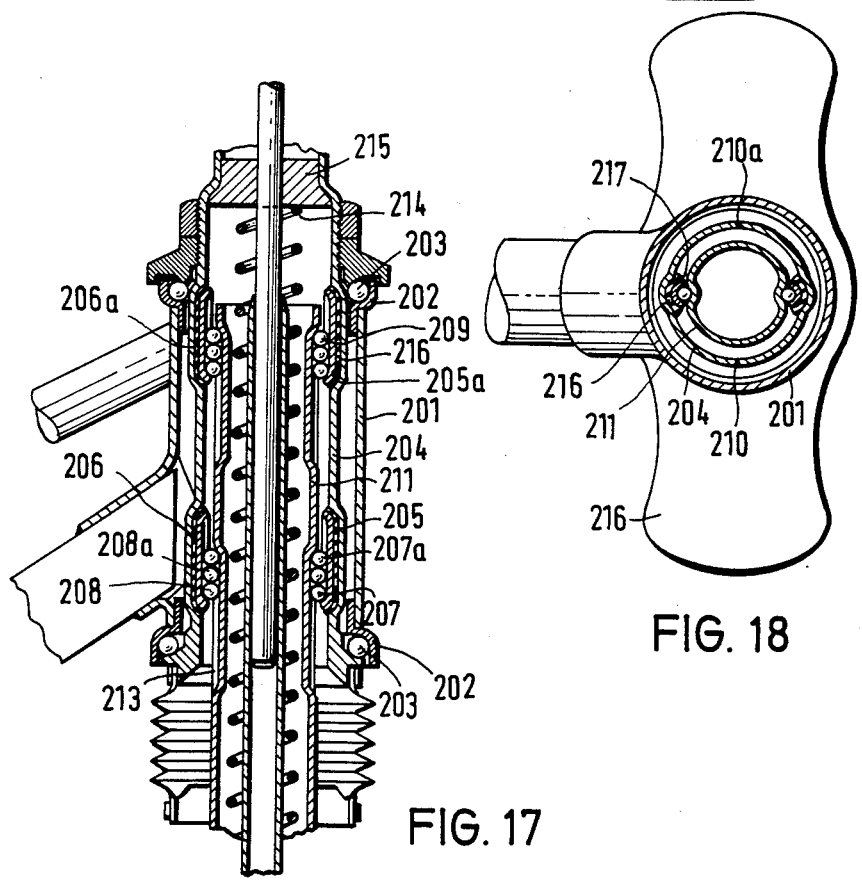
FIG. 17
FIG. 18

BICYCLE, IN PARTICULAR WITH AN ELECTROMOTOR

BACKGROUND OF THE INVENTION

The invention relates to a bicycle, in particular with a drive by means of an electromotor.

Known bicycles with electromotors have a large battery mounted on the baggage frame. The electromotor drives the wheel by means of a friction wheel, so that the drive through the electromotor and the pedal drive are completely separated. Also, the switching on and off of the electrodrive is difficult.

Since bicycles with an additional drive by means of an electromotor must be light as far as weight is concerned and since therefore the batteries as a storage for the electrical energy must be present with a light weight, large power density or in small numbers, it is difficult even with the most modern technologies, systems and devices to satisfactorily solve the problem of economy by means of specific capacities. Therefore, the control of the electrodrive becomes very important, in addition to the best possible degree of efficiencies of the individual units.

SUMMARY OF THE INVENTION

It is an object of this invention to provide a bicycle which is of lower weight and a high degree of driving safety and is characterized by a high degree of driving comfort and in which an electrical drive can be switched in any driving situation, whereby the drive drives the bicycle alone or in conjunction with the pedal drive. Furthermore, the driver should be able to determine the power proportion which he wants to transmit through the pedal drive or the motor. Finally, the speed should be picked up with simple means and during a downhill driving the recharging of the batteries should occur.

For obtaining this object, it is suggested in a bicycle with a drive by means of an electromotor in accordance with the invention that the electrodrive and the pedal drive act together but separately from each other on the rear wheel boss, and that a freewheeling device is provided for the pedal drive and the electrodrive.

With this suggestion it is achieved that the pedal drive and also the electrodrive act independently or can be switched together, so that the electrodrive is active in addition to the pedal drive.

A control device is suggested in a further embodiment in accordance with the invention, which controls the motor power of the switchable electromotor in relation to the drive power transmitted by the driver through the pedal drive.

BRIEF DESCRIPTION OF THE DRAWINGS

FIG. 1 is a side view of an electro-bicycle;

FIG. 2 is a top plan view of the drive of the rear wheel with the pedal and/or electromotor;

FIG. 3 is a side view of the clutch between the chain drive on the rear wheel boss driven by the motor and the rear wheel, in accordance with FIG. 2;

FIG. 10 is a partial side view of a chain plate of the pedal drive;

FIG. 11 is a vertical section through the chain plate of FIG. 10 on line XI—XI thereon;

FIG. 12 shows the upper segment of FIG. 11;

FIG. 16 is a side view of the bicycle with the suspension of the front wheel;

FIG. 17 is a vertical section through the suspension of the front wheel provided in the steering head tube;

FIG. 18 is a sectional view of the suspension in accordance with FIG. 6 in a vertical section corresponding to, on line XVII—XVII of FIG. 17.

DETAILED DESCRIPTION OF THE PREFERRED EMBODIMENTS

Figure 4:
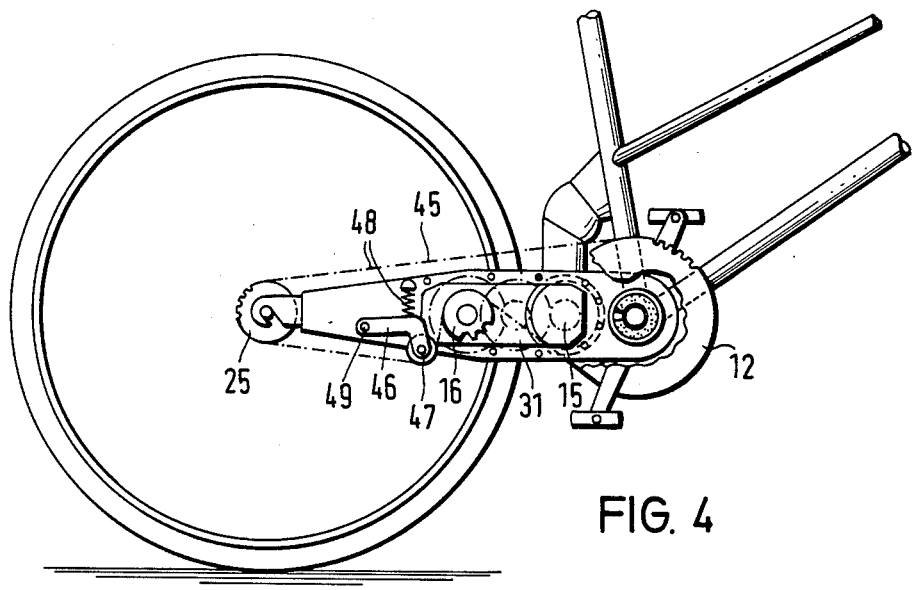
FIG. 4 is a partial sectional view with the drive over only one drive chain in a side view.

In accordance with FIG. 1, the bicycle 10 has a pedal drive 11 with the chain wheel 12 and the chain 13 which drives the chain wheel on the rear wheel boss 14, as will be explained in detail with respect to FIG. 2. An electromotor 15 is illustrated which drives the chain wheel 16 over a drive which drives with chain 17 the chain wheel 18 on the rear wheel boss 14.

FIG. 2 shows in top plan view the bottom bracket bearings housing 19 with the foot pedals 20 and 21 each provided with pedal 22. The numeral reference 12 designates the chain plate wheel in which the freewheeling device is positioned. Chain 13 starts from the chain wheel driving a chain wheel 24 on the rear wheel boss. A further smaller chain wheel 25 is present, whereby the switching over of chain 13 from one chain wheel 24 to the other chain wheel 25 or vice versa is carried out in known manner.

The two rear fork tubes 26 and 27 are connected with each other by a crosstie rod 28 in close proximity of the bottom bracket bearings housing 19, whereby the crosstie rod is formed like a tube in accordance with the exemplified embodiment and connects the rear fork tubes by weldings 29. The electromotor 15 is mounted in this tube; the electromotor has a gear 30 which extends outwardly from fork tube 26 and the gear 30 is in camming engagement with a gear 31 which is mounted in a bearing 32 on the fork tube 26. The electromotor as a direct current short-circuit rotor preferably, has a nominal power of 300 Watt at 24 Volt and 4500 rotations per minutes. Its speed is stepless changeable. It is controlled by means of a voltage switch and electronic power controls.

The gear 30 of the electromotor and the gear 31 are present in a reducing gear ratio of 1:6 to 1:7. The chain drive 16 is present on gear 30 driving drive chain 17. This is guided around the chain wheel 33 which is mounted on the driver of the drive in the boss. A belt disc 34 is mounted on the chain wheel or the ring gear 33. The ring gear 33 and the disc 34 are preferably made in one piece. A V-belt 36 is located between the two belt discs, which belt in the tensioned stage positively connects the two discs 34 and 35 with each other. This is illustrated in detail in FIG. 3. It shows the sideview the disc 35 and a deflection roller 37 mounted above the two discs 34 and 35 on a lever or fork 38. The lever 38 is pivotably mounted by means of a pin 39 on a shoulder 40 of fork tube 26. The lever 38 is provided with a transverse face 41 and in connection therewith an adjustment screw 42 and a rope 43 which pulls the roller 37 from the discs 34 and 35, so that the V-belt 36 is tensioned, thus connecting the two discs with each other. Therefore, the electromotor 15 can generate electricity and charge the batteries, for example, during a downhill driving through chain 17 and the aforementioned gear 30 and 31, because the rear wheel 44 is connected through the disc clutch in connection with the V-belt and the chain wheel 33. A return pull spring, not shown, is provided on lever 38, so that the roller 37 approaches the discs so that the V-belt 36 relaxes and assumes its round shape. Thereby, the two discs are again separated. The freewheeling device of the electromotor has an associated stopper.

FIG. 4 shows that a common chain 45 is provided for the chain wheel 12 and the driving pinion 16 which is driven by the driving pinion of the electromotor 15 through another driving pinion 31. In driving direction behind the driving pinion 16 which drives the chain 45, a chain tightener 46 is provided with driving pinion 47 which is pivoted around the axis 49 by the pressure of spring 48. The driving pinion 16 is provided with a freewheeling device. The chain wheel 12 is also provided with a freewheeling device which will be described later.

Figure 5:
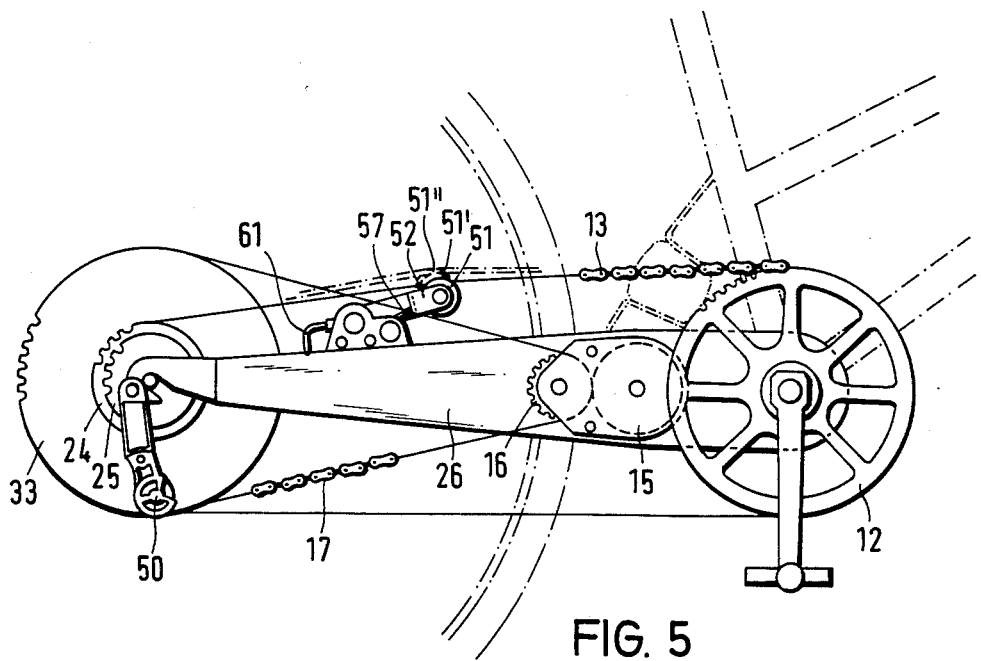
FIG. 5 shows the drives of the bicycle with two chains.

FIG. 5 shows, in principle, the illustrated solution of FIG. 2 with two chains 13 and 17 in a sideview. Present is the chain thrower 50 which in a known manner can throw the chain 17 onto chain wheels or gears 24 or 25. It should be noted that for the common chain 45 for the electromotor and the pedal drive such a chain thrower 50 may be provided on the rear boss, so that the throwing over to different chain wheels 24,25 of different diameters can be performed with known means. Both have a common freewheeling device. The gear 30 (FIG. 2) which is driven by electromotor 15 with chain 17 is provided with a freewheeling device which integrates therewith, so that two freewheeling devices are provided in the rear wheel boss.

The reference numeral 51 designates the driving pinion of the chain tightener which grips the chain 13 from below and tensions the chain in such a manner that it extends with a light bend and not in a straight line from the tangential point of the chain wheel 12 to the tangential point of the chain wheel 24 or 25, caused by the driving pinion of the chain tightener.

Figure 6:
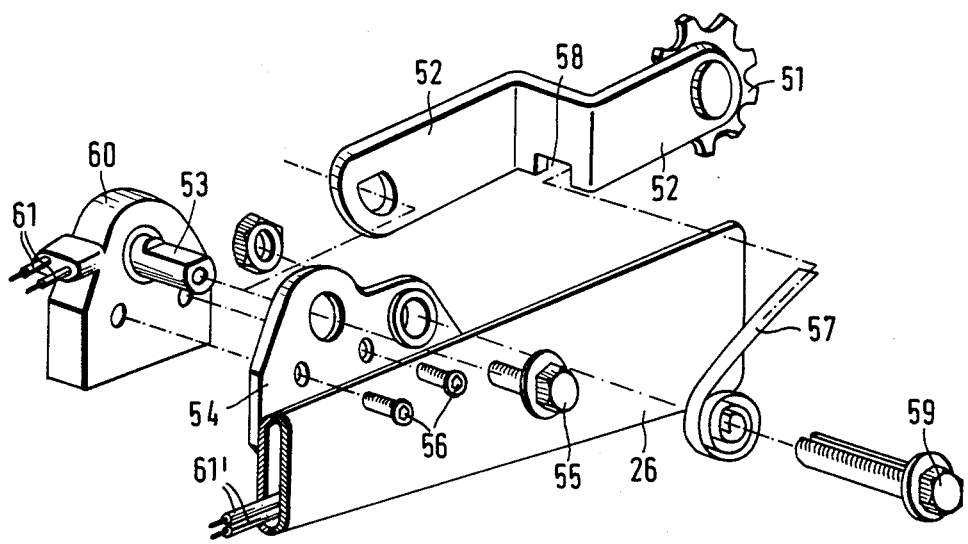
FIG. 6 is an exploded view of the chain tightener with potentiometer.

The details of the chain tightener are shown in FIG. 6. The aforementioned driving pinion 51 is rotatably mounted on an axis of lever 52 which is bend at an angle at about half of its length. This lever 52 is mounted on a shaft 53 which is flattened, so that the rotating angle of the chain tightener lever is transmitted to shaft 53 through a recess in lever 52 adjusted to the cross section of the flattened shaft 52. This shaft 53 is mounted on mounting faces 54 by means of a mounting screw 55. The mounting faces are formed on a mounting sheet metal 54 which is mounted on the rear wheel rocking fork tube 26 by means of screws 56.

The tension of the chain tightener, i.e., the force with which it engages from below the chain 13 leaving the pedal drive is adjusted by a volute buffer spring 57 which engages with its front free end in a recess 58 of lever 52 and with its other free end into the slot of a screw 59.

The spring force of the volute buffer spring is adjustable. In the rest position of the bicycle, a position of the driving pinion is already obtained due to a low spring force, whereby this position is indicated with 51″ (FIG. 5). Thereby, the chain is stronly bent. As soon as the volute buffer spring 57 is more strongly adjusted the driving pinion 51 assumes the same position and accordingly the strong bend in the chain is present. However, due to different adjustments of the volute buffer spring, differences are obtained during driving. As soon as a strong pedal force, or in other words, a strong torque and a corresponding strong pull is exerted on the chain, the driving pinion 51 is then pushed downwardly depending on the exerted force, so that during a strong force it assumes the position 51′. The potentiometer 60 shown in FIG. 6 is rotated correspondingly around a larger angle amount, so that in dependence from this rotation, transmitted by the electrical lines 61 and 61′, a stronger operating capacity is performed by the electromotor. However, if the spring is not so strongly pretensioned, because a weaker driver does not wish to have such a strong pretension, then the chain and thereby also the chain driving pinion will reach the position designated with 51′ in FIG. 5 at a lesser power effort, so that the electromotor is also proportionally activated for the drive power by the pedal.

Since during a rotation of the pedal wheel plate 12 different forces are exerted depending on the position of the pedals, which forces in the position of the pedals vertically above each other result in only a lower force transmission by the feet of the driver, but result in a maximum force transmission in the position of the pedals in a horizontal plane adjacent each other, thus resulting in a given different voltage and thereby resulting in vibrations in the upper part of the chain 13, it is suggested to balance these differences by an electronic time member, thus obtaining a median value for the control of the potentiometer. Since this potentiometer controls the power of the electromotor it could result in a different speed or capacity of the electromotor, if only to a lesser degree, at each rotation of the chain wheel.

Figure 7:
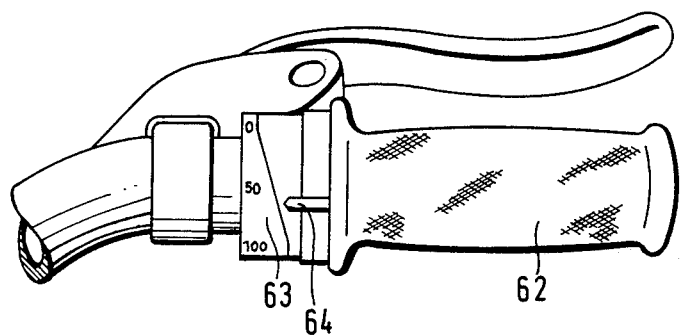
FIG. 7 shows a control grip for controlling the percentage proportion of power drive due to the pedal power in a ratio to the motor power.

FIG. 7 shows a control grip 62 through which the driver can adjust the percentage ratio by means of a further potentiometer with which the driving capacity should be obtained through pedal power and/or the electromotor independent whether a given lower or larger driving power is required. The control grip actuates a potentiometer which controls the power of the electromotor through a pulse control. A scale 63 is provided with a graduation of from 0 to 100 percent in connection with an indicator mounted on the control grip. The driver elects the percentage ratio by means of the control grip for the power to be generated by him or by the electromotor. In accordance with the illustration a percentage proportion of 60 percent is generated of the total driving power, while only a 40 percent of the remaining power has to be generated by the driver by means of the pedal. As soon as the driver turns the control grip in such a manner that the indicator on scale 63 shows the number zero, it means that the driving power is exclusively generated by pedal power.

It should be noted that the adjustment device for determining the percentage driving power through pedal power and/or the electromotor can consist of different adjustment devices.

Figure 8:
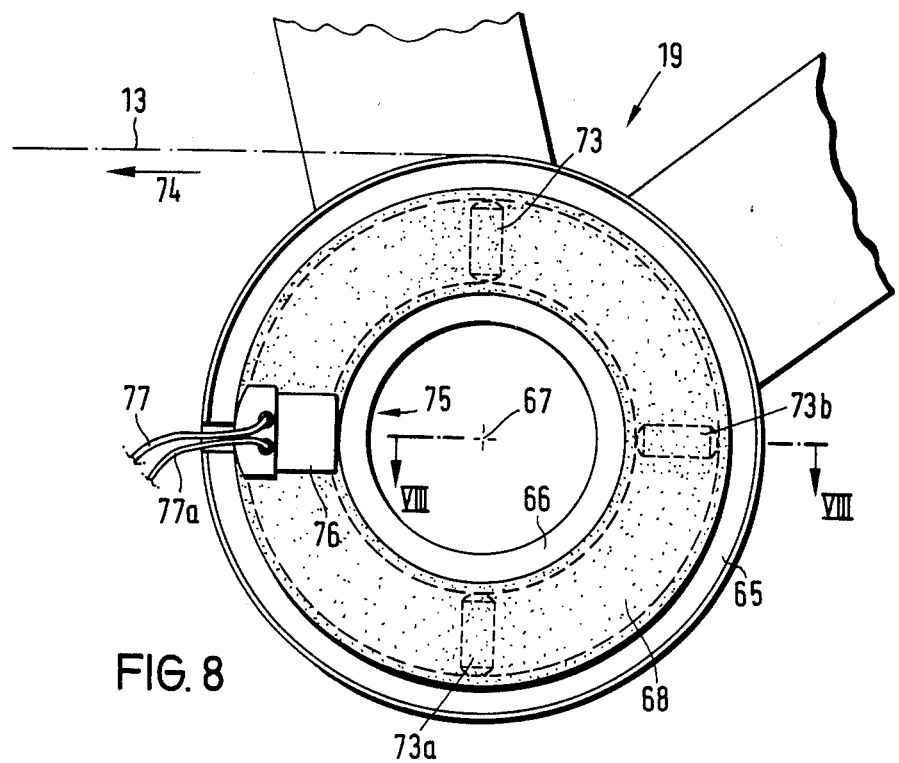
FIG. 8 shows a further metering device for measuring the pedal power.
Figure 9:
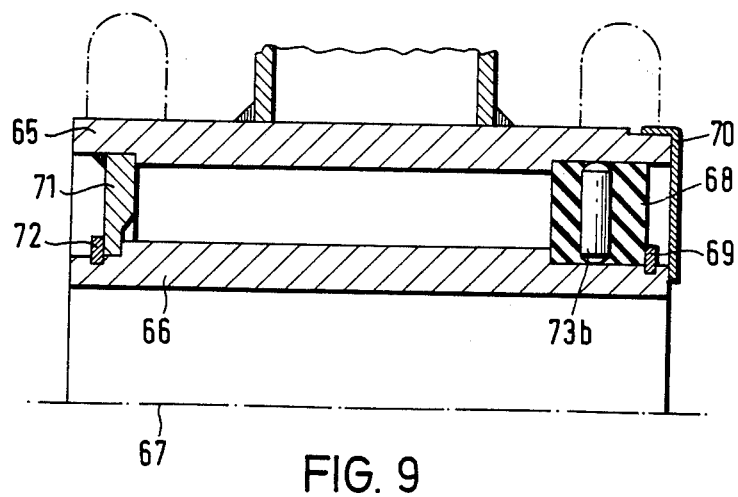
FIG. 9 shows the device in accordance with FIG. 8 in a horizontal section on line IX—IX.

FIG. 8 shows a vertical section of the arrangement of a metering device by means of a deformable element, for example, rubber, for measuring the pedal power. For this purpose, the bottom bracket bearings housing 19 for the drive wheel 12 is formed by an outer bottom bracket bearings tube 65 and an inner bottom bracket bearings tube 66. Thereby, the bearing for the chain wheel 12 is provided with the rotating axis 67 within the bottom bracket bearings tube 66. Between the two tubes 65 and 66 at the edge opposite to the chain edge an element 68 is provided which is deformable and consists of rubber which is retained in a corresponding recesses of outer tube 65 and inner tube 66 in conjunction with a safety ring 69. This element is covered by a sheet metal plate 70. On the opposite end of tubes 65 and 66 a non-deformable ring 71 consisting of metal is welded on the outer tube 65 and is retained on the inner tube by means of a safety ring 72 (FIG. 9). In the front face, distance spacers are provided in driving direction in form of three pins 73,73a,73b which have the function that during stress on the rubber element 68 during a rotating operation the rubber element does not undergo a deformation in the front area, but that the chain or ring 68 can exert a force in the direction of the arrow 74 with the object that the inner ring 66 is displaced in the direction of arrow 75. This displacement, which is dependent from the torque or the force exerted on the chain as a counter ford, is transmitted to the piezoelectric pressure absorber 76 which is provided with electrical wires 77, 77a which transmits the obtained value to the control device which determines the median value in the aforementioned manner and transmits it to the control of the drive for the electric drive motor in such a manner that if the driver excerts a strong force through the pedal power, the electromotor should also generate a corresponding strong power. If the driver does not execute any power, for example, because the bicycle drives on a downhill road, the electromotor also does not exert any power. It should be noted that this occurs independent of the percentage proportion in which the driver and/or the electromotor should have an active part on the total driving power in accordance with the description of the control grip of FIG. 7.

FIGS. 10, 11 show a conventional bearing housing 78 into which a rotating bearing bushing 76,78 into which a rotating bearing is screwed in for mounting the bottom bracket bearings 80 at whose outwardly extending end the chain wheel 12 is mounted. This is provided in known manner with spokes 81,82,83. For dimensioning the pedal force, a ring 84 made of rubber is provided which has ribs 85,86,87 etc. directed in axial direction of the chain rim whose number and a distance correspond to those of the spokes 81,82,83 etc. The spokes are subdivided. They have inner segments 88 and outer segments 89, whereby the inner segments have support faces 90 which in their majority form a circumferential face and have faces 91 extending in the radial as the well as axial direction. The outer segments 89 have faces 92 which extend in the radial and the axial direction and upper support faces 93 which in their majority also form a circumferential face associated with the individual spokes. The aforementioned faces of the ribs embrace one each rib 85. A first permanent magnet disc 94 is mounted on ring 84 and opposite thereto a second permanent magnet disc 95 is mounted, which is stationarilly mounted on the bottom bracket bearings housing 78. A metering receiver 96 is provided for metering an electromagnetic field dimension, here advantageously in form of of a Hall-probe-magnetometer.

As soon in the stated rotating direction shown by arrow 97 a pressure is exerted with the faces or the bodies 91 of spokes 81,82 and 83, on the given associated ribs 85,86 and 87 of the rubber elastic ring 84, a deformation occurs on the rubber ribs as indicated in FIG. 12, with the object that the permanent magnet disc 94 approaches the opposite permanent magnet disc 95. The resulting change in the magnetic strength is then measured and is used as a measure for the exerted pedal power or the available torque for controlling the driving power of the electromotor.

The spokes are subdivided. The numeral reference 98 designates a freewheeling device in chain plate 12.

FIG. 1 shows that the space between the lower frame tube 99 and the upper frame tube 99a are provided with a cover 99c and the batteries for the drive of the electromotor are mounted therein. Thereby the batteries are positioned in a favorable centric area of the bicycle with respect to the center of gravity. Moreover, the batteries are rechargeable, for example, with current of 220 Watt and prederably have two volt, preferably 12 batteries being switched for 24 volt. The charging device can and is preferably provided in the space between the lower and the upper frame tube in close proximity of the batteries.

Figure 13:
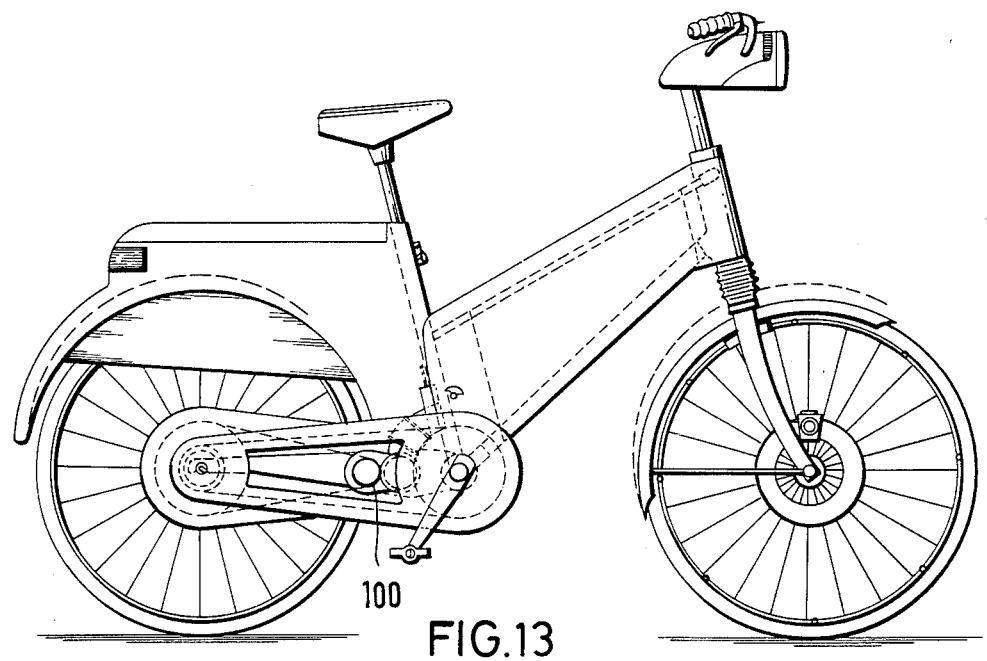
FIG. 13 shows a side view of the bicycle with the suspension of the rear wheel.
Figure 15:
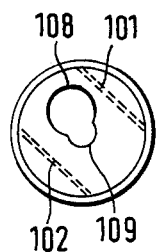
FIG. 15 is a top plan view of the mounting face for the exchangeable rubber block in accordance with FIG. 14.
Figure 14:
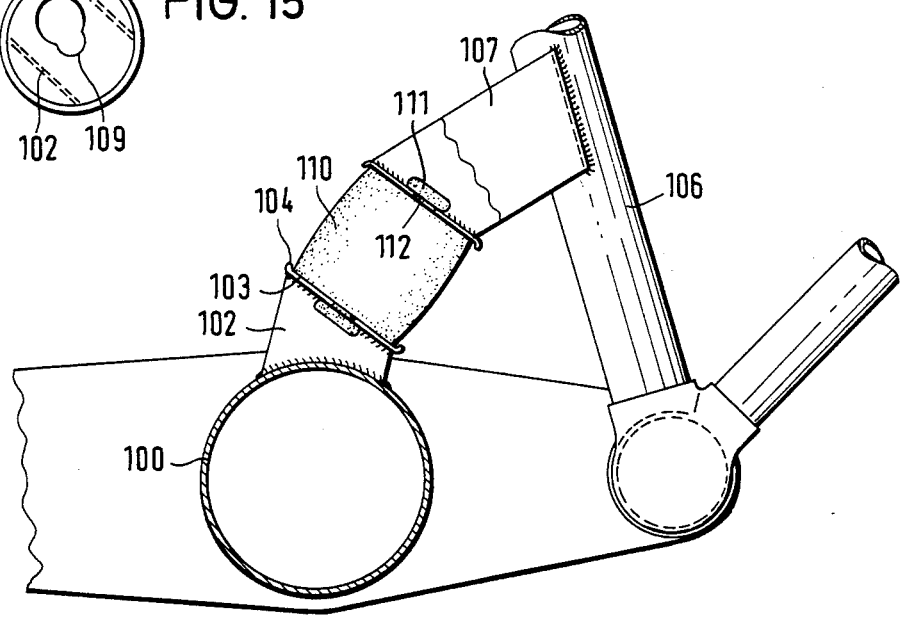
FIG. 14 shows the suspension of the rear wheel between the rear fork tube and the seat tube in a side view.

FIGS. 13 through 15 show that a suspension is provided on the transverse tube 100 which also receives the electromotor. For this purpose, two sheet metal plates 101 and 102 are provided which are at a lateral distance from each other being provided with a ring disc 103 which has a flanged edge 104.

In the same manner two sheet metal plates 107 are welded on a seat tube 106, which plates also have a ring disc at the front which is shaped in the same manner as the ring disc 103. The ring discs have an excentric opening 108 of a larger diameter and a central opening 109 of a smaller diameter for receiving a rubber block 110 which is provided at each side with a head 111 and a neck 112. This rubber block 110 of a cylindrical shape is available in different Shore-hardnesses at preferably the same length, so that depending on the weight of the driver or other conditions one can exchange the same without any tools, thus obtaining a different suspension characteristics.

FIG. 16 shows a bicycle whose suspension of the front wheel is provided in the steering head 200. In accordance with FIG. 17, the steering head tube 201 is provided at its both ends with bearing cups 202 for receiving balls 203 for steering the front wheel. A guide tube 204 is provided within the stearing head tube which at its lower area is provided with outwardly shaped trough-like vertically extending grooves 205 and 206 on opposite sides made from stamp outs for receiving balls 207,207a and 208, 208a. In its upper area, grooves 205a,206 are provided which are obtained in the same manner and shaped by stamp outs for receiving balls 200,209a. This guide tube 204 consists of two parts or cups and is separated in longitudinal direction. This separation is indicated by separating lines 210 and 210a. This separation extends transversely with respect to the grooves 205 and 206 which are obtained by the stamp outs. This is necessary, so as to mount the balls. The fork tube 211 is positioned within the guide tube 204 which is not separated. In its lower area it has inwardly directed grooves 213 formed by stamp outs for the aforementioned balls 207, 208 and in its upper area ball guide grooves obtained in the same manner.

A spring 214 in form of a helical spring is provided within the fork tube 204 which abuts on an upper abutment 215 and at the lower end on an abutment face in the fork head.

FIG. 17 shows the downward position, i.e., lowered fork tube. During pressure on the spring the fork tube travels upwarly, whereby the stroke path is double of that of a groove, for example 205, because the grooves as guides of the balls add from the fork tube and the guide tube. By intermediary positioning of rubber or rubber elastic material 216 in the grooves of the guide tube 204, guide grooves in form of separated trough pieces 217 are provided for a plurality of superimposed balls. The mounting of the trough pieces 217 on guide tube 204 by an intermediary positioning of rubber or silent rubber, here preferably vulcanized on it, has the advantage that a considerable material protection of the balls and running tracks occurs because no hard vibrations are transmitted. By defining the thickness and Shore-hardness of the silent rubber 216, the characteristics of the suspension are changeable. A further essential aspect is that during mass production one does not have to manufacture within exact tolerances, because the silent rubber assures a uniform engagement of the balls with the associated running faces in the guide grooves. Hence, the silent rubber provides the balance therebetween. It results in a slight pretension and thereby a good engagement of the balls on the running faces thereof in the grooves. Also, the balls cannot slide off very well. The arrangement of the silent rubber has the advantage that no running track and roadway noises are transmitted.

Figure 19:
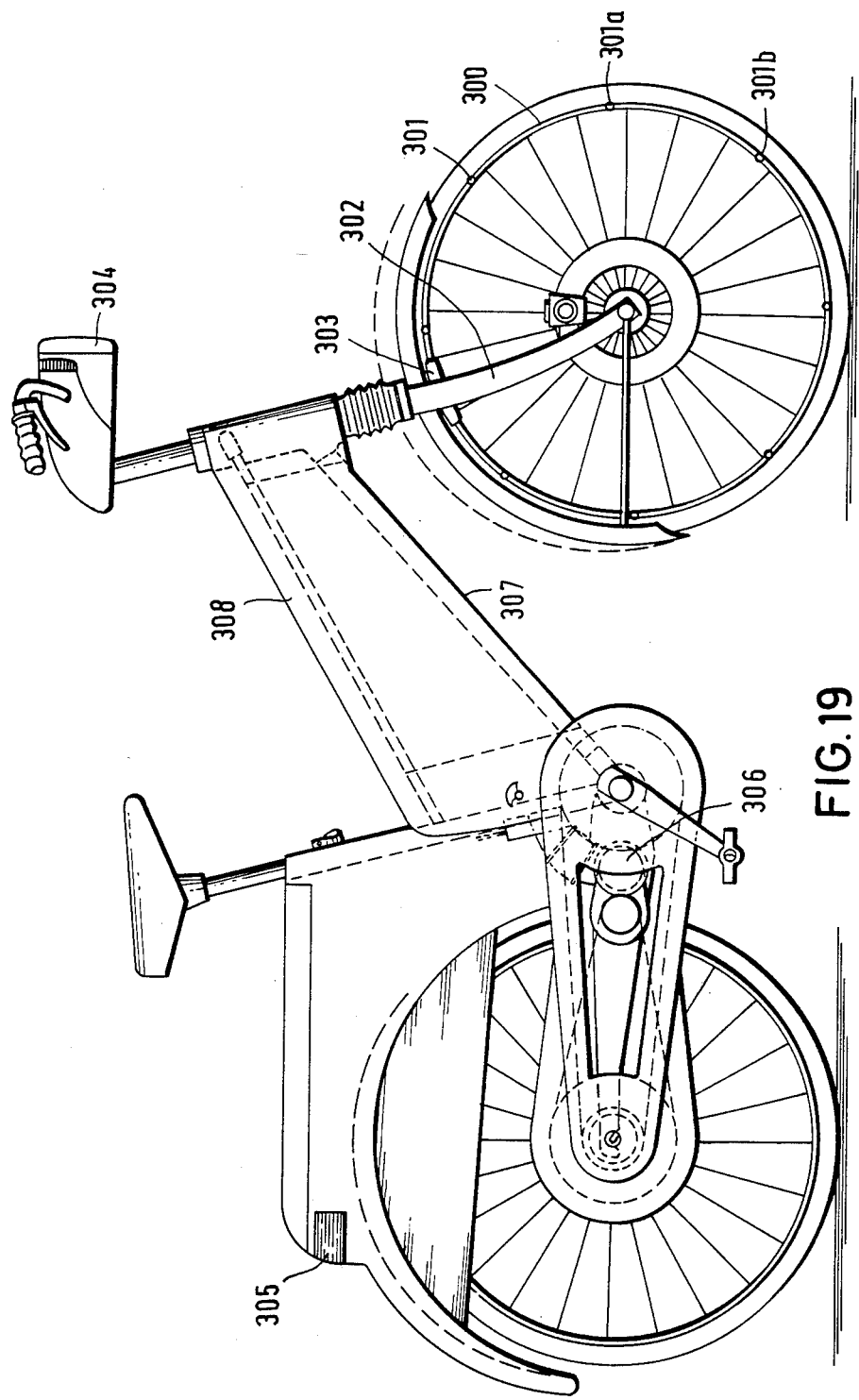
FIG. 19 is a side view of a bicycle with a generator.

In accordance with FIG. 19, a power generating device is suggested. On the rim 300 of the front wheel magnets 301a, 301b, 301c are provided mounted at uniform distances from each other which magnets generate power in conjunction with a coil or a plurality of coils mounted on the front wheel fork 302. This power generation by means of pulses may be used for the bicycle lamp 304 and the rear light 305. Therefore, the friction free operating tachogenerator can be used for other registering purposes, for example, for determining the speed and the distance, since pulses are given which are dependent from the circumferential speed and the number of the magnets. However, the generated power pulses per time unit can also be used in connection with electronic switch elements to maintain a certain speed in such a manner that when the driver does not reach the desired speed by pedal power one can automatically switch the electrodrive 306. Furthermore, the pulse transmitter permits to switch off the electromotor during downhill driving or exceeding a certain speed to generate power by the electromotor through a clutch and charging the batteries which are positioned in the area between the lower frame tube 307 and the upper frame tube 308. This receiving space for the batteries is provided with a cover 309. The power generator consisting of magnets 301 and coils 303 is free of mechanical friction. As soon as a power consumer is switched on by means of a switch it is operable.

The novel generator consisting of magnets and coils is particularly suitable for the object that by means of a drive speed scanning, in particular by means of an electronic pulse scanning, the motor is only switched on after reaching a minimum speed of the bicycle, preferably about one meter per second. Thus, it is to be avoided that the electronic drive is used for the initial driving start because most of the energy would be used for the initial driving start. However, this energy should be saved, so as to obtain a wider action radius.

I claim:

1. A bicycle having a rear wheel boss and a drive, said drive comprising: a pedal drive including a first chain plate which engages a chain that in turn engages and drives said rear wheel boss; an electrodrive including an electromotor having a free wheeling device and which drives a second chain plate which in turn drives said chain which engages and drives said rear wheel boss, said electrodrive and said pedal drive being operable together and individually on said rear wheel boss; a first free wheeling device mounted on said first chain plate; and a second free wheeling device mounted on said second chain plate.

2. A bicycle having a rear wheel boss and a drive, said drive comprising an electrodrive including an electromotor and a pedal drive, said electrodrive and said pedal drive being operated together but individually, said electrodrive and pedal drive being mounted on the rear wheel boss, said pedal drive being provided with a first free wheeling device, said electrodrive being provided with a second free wheeling device, said drive further comprising a multistage compact planetary gear provided on the rear wheel boss and having four to five stages on which said pedal drive and said electrodrive operate simultaneously to or separately from each other.

3. Bicycle in accordance with claim 2, having a rear wheel (44), a rear chain wheel (24) and an additional chain wheel (25) and in which a clutch in the form of two belt disc halves (34, 35) is provided between the chain wheel (25) driven by the electromotor (15) and the rear wheel (44), one disc half (34) being mounted on a disc wheel (33) and the other disc half (35) being mounted on the rear wheel, and the belt disc halves being connected with each other by means of a tensioned V-belt (36).

4. A bicycle having a rear wheel boss and a drive, said drive comprising an electrodrive including an electromotor and a pedal drive, said electrodrive and said pedal drive being operated together but individually, said electrodrive and pedal drive being mounted on the rear wheel boss, said pedal drive having a first chain plate with spokes, and further being provided with a first free wheeling device in the area between the spokes of said first chain plate, said electrodrive being provided with a second free wheeling device mounted on a second chain plate.

5. Bicycle in accordance with claim 4, characterized in that a common drive chain (45) for driving the rear wheel boss is provided which engages the chain plate (12) of the pedal drive and a driving pinion (16) of the electromotor (15).

6. Bicycle in accordance with claim 5, characterized in that the electrodrive has a driving pinion connected to the electromotor and driven thereby and behind the driving pinion (16) as seen in the driving direction, a chain tightener (46, 47) for acting on the chain (45) in the direction from above for generating a sufficiently dimensioned looping angle of the driving pinion (16), and that the rotating direction of the drive pinion engaging the chain and being driven by the electromotor is reversed with respect to the rotating direction of the chain plate (12) of the pedal drive.

7. Bicycle in accordance with claim 6, having a bottom bracket bearing housing (19) and characterized in that two rear wheel fork tubes (26, 27) are provided which are pivotably mounted as a structural unit about the axis of the bottom bracket bearing housing (19), and that the two rear fork tubes are connected with each other by a transverse crosstie rod (28) at a distance required for a pivot mounting, the transverse crosstie rod supporting the electromotor (15).

8. Bicycle in accordance with claim 7, characterized in that the transverse crosstie rod (28) is designed as a tube which receives the electromotor (15).

9. Bicycle in accordance with claim 8, characterized by a driving speed scanning device, in particular by an electronic pulse scanning with which the electromotor (15) can only be switched on when the bicycle reaches a minimum speed.

10. Bicycle in accordance with claim 9, characterized by a control device which controls the motor power of the switchable electromotor (15) in relation to the drive power generated by the driver through the pedal drive (12).

11. Bicycle in accordance with claim 10, characterized in that the percentage proportion of the power generated through pedal drive (12) and the power generated by the electromotor (15) with respect to the total drive power is electronically controlled and is preadjustable by means of adjustment means (62, 63, 64).

12. Bicycle in accordance with claim 10, having a front wheel with a rim and characterized in that magnets (301) are mounted on the circumference of the rim (300) of the front wheel, which are circumferentially uniformly spaced from each other and that on the side of the rim of the front wheel positioned opposite to the magnets at least one coil (303) is mounted.

13. Bicycle in accordance with claim 10, characterized in that the control device is provided with an electrical time member for smoothing the mechanical load peeks of the pedal drive (12).

14. Bicycle in accordance with claim 13, characterized in that a first mounting (102, 103) is provided which is welded on a crosstie rod (100) for connecting the two rear fork tubes and that on a seat tube (106) a second mounting is also welded, and that an easily exchangeable rubber block (110) is provided between these two mountings.

15. Bicycle in accordance with claim 11, characterized in that a metering device is provided for the pedal drive (12) which scans the power generated by the driver in the pedal drive and that the value of that power acts for controlling the drive power of the electromotor (15), and that a further adjustment device (62) is provided which can be adjusted by the driver and which controls the percentage ratio of the drive power of the electromotor (15) to the drive power generated by the pedal drive (12).

16. Bicycle in accordance with claim 15, characterized in that the power generated by the driver through the pedal drive (12) is transmitted through a first potentiometer (60) and a pulse control for controlling the drive power of the
electromotor (15), and that a second potentiometer (62) is provided which is adjustable by the driver for controlling the percentage ratio or the drive power by means of the pedal power and/or the electromotor.

17. Bicycle in accordance with claim 16, characterized in that the metering device includes a chain tightener (51, 52), having a rotational axis and provided with a spring (57), and a lever (52), the lever connected to rotating elements of the first potentiometer (60).

18. Bicycle in accordance with claim 17, characterized in that the metering device further includes an adjustment screw (59) having a slot and the spring (57) of the chain tightener (51, 52) is adjustable to the specific power intended by the given driver with its force acting on the chain tightener and is designed as a volute buffer spring, whereby the outer end engages on the lever (52) of the chain tightener and the other inner end engages the slot of the adjustable screw (59) which adjusts the spring tension.

19. Bicycle in accordance with claim 15, characterized in that the metering device includes a deformable element (68), made of rubber or plastic and which is associated with the pedal drive, that the power exerted on the pedal drive is transmitted to said deformable element and that a metering device (76, 79) is provided which determines the deformation whose value influences the power of the electromotor in conjunction with an associated control.

20. Bicycle in accordance with claim 19, characterized in that the bottom bracket bearing housing (19) includes an outer bottom bracket bearings tube (69) and a coaxial inner bottom bracket bearings tube (66) positioned at a radial distance therefrom to form a space therebetween, and in the space between the outer bottom bracket bearings tube and the inner bottom bracket bearings tube a ring (68) of deformable material is provided, and that a piezoelectric pressure absorber (76) is provided which engages on an outer face of the inner bottom bracket bearings tube (66).

21. Bicycle in accordance with claim 15, characterized in that the metering device includes a deformable element (84) of rubber or plastic and which is positioned on a rim of the chain plate of the pedal drive, a first permanent magnet disc (94) mounted on the deformable element, a second permanent magnetic disc (95) mounted on the bottom bracket bearing tube (78) opposite and at a distance from the first permanent magnet disc, said distance being changed upon the deformation of said deformable element (84), and a metering receiver (96) for electromagnetic field forces, in form of a magnetometer for determining the changeable distance between the two magnetic discs.

22. Bicycle in accordance with claim 21, characterized in that the deformable element is designed as a ring and is mounted between the spokes (81, 82, 83) of the chain plate, thus connecting the same.

23. A bicycle having a front wheel fork with a steering head tube, a rear wheel boss and a drive, said drive comprising an electrodrive and a pedal drive, said electrodrive and said pedal drive being operated together but individually, said electrodrive and pedal drive being mounted on the rear wheel boss and provided with a first free wheeling device for the pedal drive and a second free wheeling device for the electrodrive, said front wheel fork being provided with a suspension positioned in said steering head tube.

24. Bicycle in accordance with claim 23, having a steering head tube and a fork tube and characterized in that a guide tube (204) is provided in the steering head tube (201) which in the upper and lower area thereof is formed with grooves on two opposite sides thereof in the form of outwardly directed stamp outs for receiving balls (207) and that the fork tube (211) is mounted in the guide tube (204) and the fork tube is provided in the upper and lower area thereof with grooves on opposite sides in the form of inwardly directed stamp outs for receiving the aforementioned balls, and that inside the fork tube a spring element (214) is provided which is supported on an upper abutment face (215) formed in the guide tube (204).

25. A bicycle having a rear wheel boss and a drive, said drive comprising an electrodrive and a pedal drive, said electrodrive and said pedal drive being operated together but individually, said electrodrive and pedal drive being mounted on the rear wheel boss, said pedal drive being provided with a first free wheeling device mounted on a first chain plate, said electrodrive being provided with a second free wheeling device being mounted on a second chain plate, said electrodrive including an electromotor, said bicycle further including an upper frame tube and a lower frame tube spaced from each other to form a space therebetween and characterized in that the space between the lower frame tube and the upper frame tube is provided with a covering and that batteries for the electromotor are provided in this covering.

26. A bicycle having a rear wheel boss and a drive, said drive comprising an electrodrive and a pedal drive, said electrodrive and said pedal drive being mounted on the rear wheel boss and provided with a first freewheeling device for the pedal drive and a second freewheeling device for the electrodrive, said electrodrive including an electromotor, said bicycle further having a driving speed scanning device, in particular by an electronic pulse scanning with which the electromotor can only be switched on when the bicycle reaches a minimum speed of about one meter per second.

* * * * *